United States Patent
Cazanas et al.

(10) Patent No.: US 8,977,408 B1
(45) Date of Patent: Mar. 10, 2015

(54) VEHICLE SETTINGS PROFILE SYSTEM

(75) Inventors: Carlos A. Cazanas, Bethlehem, PA (US); Azam Khan, Franklin, NJ (US); Terence John Sullivan, Pequannock, NJ (US)

(73) Assignee: Cellco Partnership, Basking Ridge, NJ (US)

(*) Notice: Subject to any disclaimer, the term of this patent is extended or adjusted under 35 U.S.C. 154(b) by 712 days.

(21) Appl. No.: 13/243,396

(22) Filed: Sep. 23, 2011

(51) Int. Cl.
*B60R 25/00* (2013.01)

(52) U.S. Cl.
USPC .............................. 701/2; 455/3.03

(58) Field of Classification Search
USPC .......... 701/2, 36, 49, 451, 453; 340/531, 534, 340/539.1, 539.11, 539.16–539.19, 5.2, 340/5.21–5.25, 5.52–5.54, 5.8, 5.81–5.86; 455/3.03
See application file for complete search history.

(56) References Cited

U.S. PATENT DOCUMENTS

| | | | |
|---|---|---|---|
| 6,127,947 A * | 10/2000 | Uchida et al. | 340/999 |
| 6,728,531 B1 * | 4/2004 | Lee et al. | 455/419 |
| 8,370,030 B1 * | 2/2013 | Gurin | 701/49 |
| 2008/0275604 A1 * | 11/2008 | Perry et al. | 701/33 |
| 2012/0225634 A1 * | 9/2012 | Gee et al. | 455/404.2 |

* cited by examiner

*Primary Examiner* — Dalena Tran

(57) ABSTRACT

A system for transferring driver profile settings has a communication interface, processor, storage device, and program in the storage device. The communication interface allows for network communications. The processor couples to the interface. Execution of the program from storage by the processor configures the system to perform functions. The system allows for transfer of a driver profile from the storage device to a vehicle for application on the vehicle. The driver profile specifies one or more preference settings for one or more configurable components of a vehicle.

21 Claims, 6 Drawing Sheets

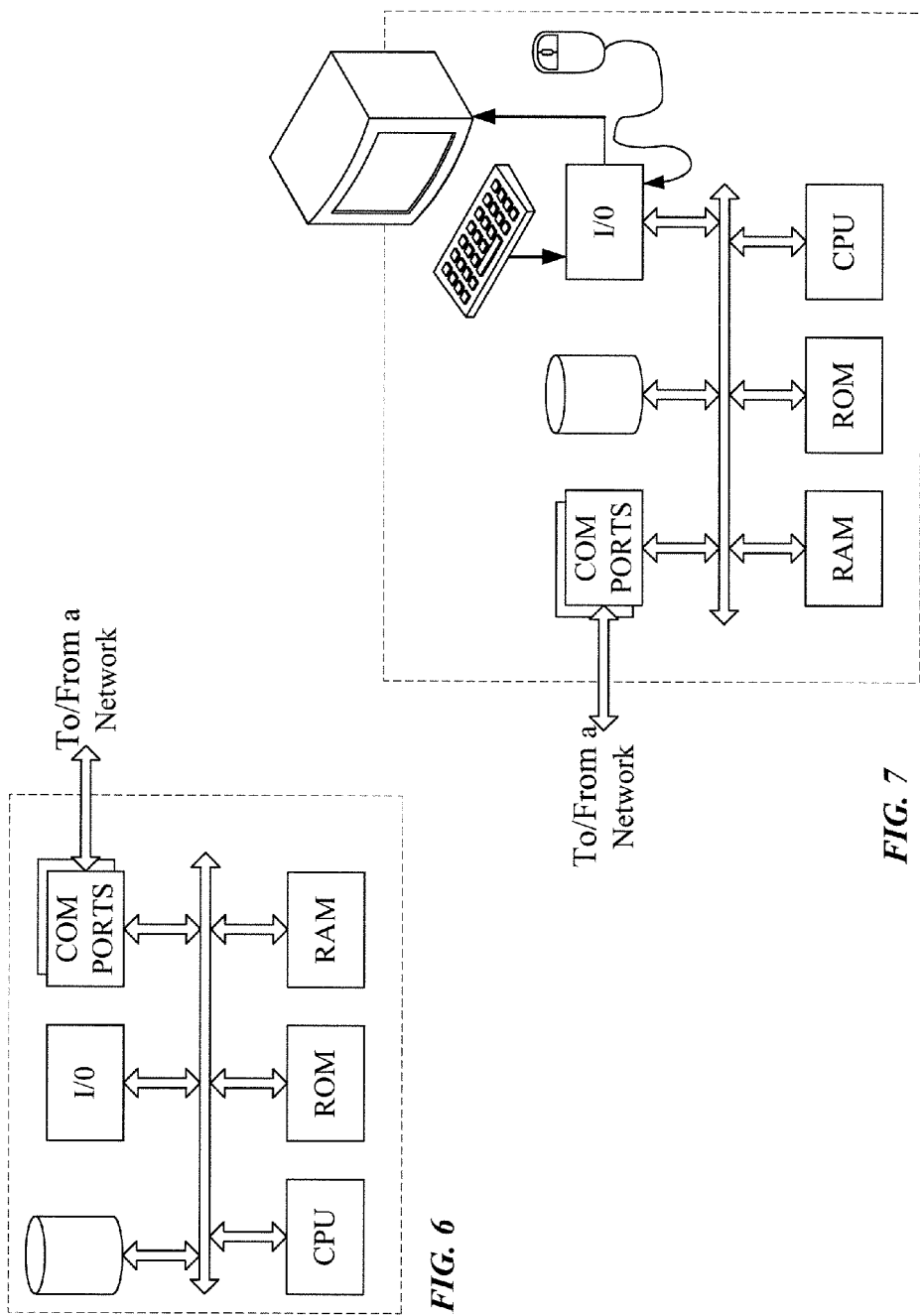

VEHICLE SETTINGS PROFILE SYSTEM

TECHNICAL FIELD

The present subject matter relates to technologies to transfer a driver's profile with one or more settings for user configurable features of a vehicle, such as any one or more of: seat position, positions of mirrors, one or more pedal positions, radio station presets, HVAC settings, navigation screen configuration, etc., from storage in a memory on a computer through a network to a different vehicle for the driver.

BACKGROUND

In recent years, many vehicles have utilized a driver's profile in order for a user to quickly recall settings for a number of user configurable features, such as, seat position, positions of mirrors, one or more pedal positions, radio stations presets, HVAC settings, navigation screen configuration, and the like. A user profile is stored in a memory on the vehicle, such as in an electronic control unit ("ECU") of the vehicle, or other controller or computer on the vehicle. Many such vehicles today can store profiles for a number of different users. Each user can adjust any or all of the user configurable features of the particular vehicle to the user's desired settings, and save these setting to the memory of the vehicle as the user's own user profile. Therefore, if multiple users regularly operate the vehicle, such as a husband and wife, each user may store a user profile on the vehicle, and quickly restore all of their settings when they get in the vehicle by recalling their own user profile. However, if a user gets into a different vehicle, such as a rental car, they have to again adjust every user configurable feature to a desired position. This can be a time consuming exercise, and may be further complicated in a vehicle the user is not accustomed to driving, such as a rental car.

Hence a need exists for a system to allow a user profile to be recalled in multiple vehicles, even a vehicle the user does not typically operate, or a different type of vehicle from what the user typically operates.

SUMMARY

To improve over the art and address one or more of the problems outlined above, the examples herein provide technologies to allow transfer of a driver's profile with one or more settings for user configurable features of a vehicle to and/or from a server via network communications. For example, settings input and stored for one vehicle may be uploaded to the server and later transferred to a different vehicle. If the vehicles are of different types, the technology may also transcode the preference setting(s) to provide the user preferred configuration from one type of vehicle on a different type of vehicle.

According to one example, a system for use in a vehicle has an interface, a mobile communications transceiver, a processor, a memory, and a program stored in the processor. The interface receives signals from and sends signals to one or more input elements. The mobile communication transceiver allows wireless communications through a mobile communication network. The processor is coupled to the interface and the wireless transceiver. The memory is coupled to the processor. Execution of the program by the processor configures the system to perform functions. The program detects an identification associated with a user in proximity of a vehicle. The program sends a query via the mobile communication network to a server. The query includes the identification associated with the user and information related to the vehicle. A response is received from the server via the mobile communication network. The response includes a driver profile for the user. The driver profile specifies a driver preference setting for each of one or more configurable components of the vehicle. The one or more driver preference settings specified in the driver profile conform to preferences of the user previously supplied to the server.

According to another example, a system is provided for transferring driver profile settings. The system comprises a communication interface, a processor, a storage device, and a program in the storage device. The communication interface allows for network communications. The processor couples to the interface. The storage device couples to the processor. Execution of the program by the processor configures the system to perform functions. A first function receives a query, from a unit in a vehicle though a mobile communication network to the interface sent from the unit upon a user being in proximity of the vehicle. The query includes an identification associated with the user and information related to the vehicle. The identification associated with the user is utilized to look up a record of the user in the storage device to obtain a preference of the user for each of one or more configurable vehicle components. A response message transmits from the interface back through the mobile communication network to the unit in the vehicle. The response message includes a driver profile specifying a driver preference settings for each of the one or more configurable components of the vehicle conforming to the one or more preferences of the user previously supplied to the server.

According to one process, a method of saving a user profile for a vehicle to a server is provided. Information related to user identification is received in a unit on a vehicle. Information related to a setting for at least one user adjustable element on the vehicle is received in a unit on the vehicle based upon an input from a user. A user profile is stored on the vehicle. The user profile contains information related to the setting for the at least one user adjustable element. The user identification and the user profile are uploaded to a server via a wireless communications network using a telematics unit on the vehicle. The user profile is stored on the server in an account associated with a user's unique identification number.

According to another process, a method of retrieving a user profile for a vehicle from a server is provided. A query from a vehicle unit is received at a server via a wireless communications network. The query includes a user identification. A user's account is located on the server based at least in part upon the user identification received in the query from the vehicle unit. A vehicle user profile is transmitted from the user's account on the server to the vehicle with the telematics unit via the wireless communications network. The user profile contains information related to the settings for at least one user configurable component of the vehicle. The user profile is adapted to set the at least one user configurable component in the vehicle.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only.

FIG. 6 is a simplified functional block diagram of a computer that may be configured as a host or server.

FIG. 7 is a simplified functional block diagram of a personal computer or other work station or terminal device.

DETAILED DESCRIPTION

Figure 1:
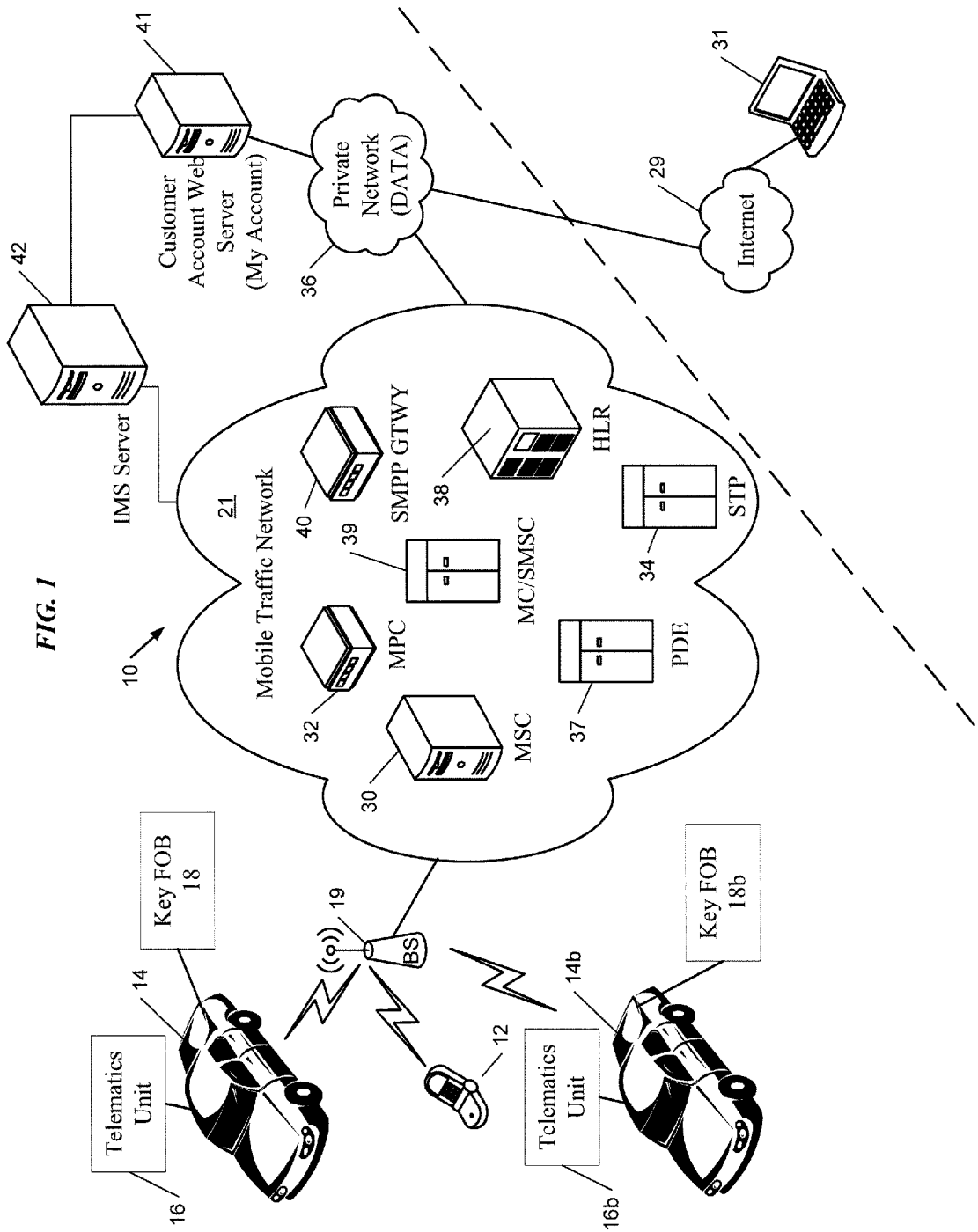
FIG. 1 is a functional block diagram that depicts various components of an exemplary mobile communications network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples shown in the drawings and described in detail below with reference to the drawings relate to functionality, systems, and methods of allowing a user to store and retrieve a driver profile containing settings for one or more user configurable vehicle features, such as seat position and mirror settings, are described herein. Various illustrated examples reference a unit on-board one or more of the vehicles, a driver profile storage and retrieval system, and methods of using the such equipment that are executed over a mobile communications network.

As used herein, a "setting" is a location, position, level, orientation or the like for a configurable vehicle feature, such as a seat location, a mirror position, a level of bass on a radio, an orientation of a map on a navigation system, a contact list for use with an integrated telephone, and the like.

As used herein, a "user profile" includes stored settings for one or more user configurable vehicle features, such as, but not limited to, seat position, mirror position, one or more pedal positions, radio station presets, vehicle audio settings, navigation system settings, and vehicle HVAC settings. A profile created for or on one vehicle, for example, is uploaded via a network and stored in a server in association with a user's account (based on a user identification or "ID"). The user ID may for example comprise a user's mobile directory number (MDN), a user's email address, or other alpha and/or numeric string. The profile can then be downloaded to another vehicle of a similar type to configure the components of the second vehicle in the same way as the user may desire when the user enters the ID on the other vehicle. As another example, if the user wants to operate a vehicle of a different type, the profile from storage may be transcoded by the server or otherwise modified to produce a scaled version or profile for downloading to the other vehicle to set the configurable components appropriately in the other type of vehicle.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements collectively indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations (not shown) outside of the mobile communication network 10. The mobile stations served by the network 10 include typical mobile stations generally represented by the mobile station 12 in FIG. 1 as well as other types of devices having appropriate mobile communication capabilities, in this case, including units in on-board vehicles. The mobile communications for the on-board units may support a variety of different services or applications, such as telematics emergency report (e.g., OnStar) and location-related services like maps and driving directions as might be provided through navigation units, etc. For purposes of the present discussions, the mobile communications for the on-board units support communications of a driver's profile with one or more settings for user configurable features to/from one or more of the vehicles, e.g. uploading of a profile created on one vehicle and downloading to another vehicle.

The wireless mobile communications network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the 4G Long Term Evolution (LTE) standard, the Global System for Mobile (GSM) communication standard, a time division multiple access (TDMA) standard, a 3rd Generation Partnership Project Long Term Evolution (3GPP LTE), a 3rd Generation Partnership Project Long Term Evolution Advanced (3GPP LTE Advanced), an International Mobile Telecommunications Advanced (IMT-Advanced), or other standards used for public mobile wireless communications. The mobile station 12 may be capable of conventional voice telephone communications and data communication.

A mobile station 12 appears in the drawing that receives one or more of the various communication services available from the mobile communications network 10. The network 10 allows users of the mobile stations such as 12 (and other mobile stations not shown) to initiate and receive telephone calls to each other as well as through the public switched telephone network or "PSTN" and telephone stations connected to the PSTN. The network 10 also offers a variety of data services via, such as downloads, web browsing, email, etc. Compatible mobile stations 12 may are capable of voice telephone communications through the network 10, and for many modern services, the exemplary mobile devices 12 are capable of data communications through the particular type of network 10 (and the users thereof typically will have subscribed to data service through the network). For example, the mobile station 12 can receive location based services (LBS) that utilize network communications to leverage the use of an internal global position system (GPS) receiver. The GPS receiver alone, or in combination (aGPS) with other network elements can determine the latitude and longitude of the mobile station 12. The mobile station 12 may also wirelessly connect, such as via Bluetooth technology, to other devices. The wireless connection to other devices allows the other devices to connect to the mobile communication network 10 through the mobile station 12.

Mobile stations 12 today take various forms, such a handset type feature phones, various keyboard and touchscreen type smartphones, personal digital assistants (PDAs), tablets, portable notebook or netbook computers, etc. The network 10 also provides services to other types of devices with appropriate wireless transceivers similar to those used in the mobile stations. Such other types of mobile devices may be standalone units or associated with or incorporated into other equipment. In the example, a wireless communication device capable of communication through the network 10 is incorporated into a unit with a vehicle 14, in the illustrated example, in an automobile. In the example, the wireless communication device is incorporated in a telematics unit 16 although it may be incorporated in or associated with another type of unit within the vehicle, such as an on-board navigation unit.

The telematics unit 16 in an associated vehicle 14 can also be serviced as a mobile device that communicates with components of the mobile communications network 10. From the view of the network 10, the telematics unit 16 is essentially another mobile station 12

Figure 2:
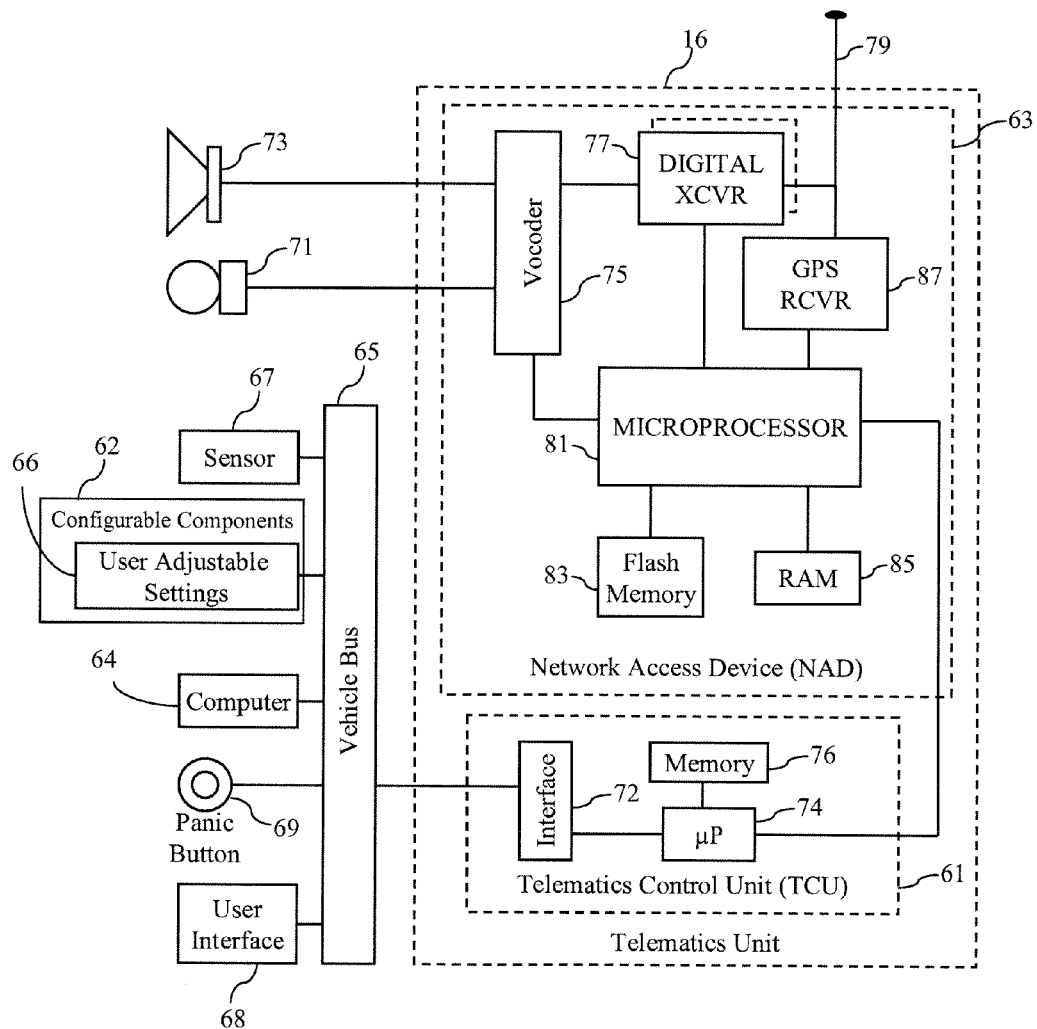
FIG. 2 is a high-level functional block diagram of a telematics unit and associated equipment, as may be provided in a vehicle.

FIG. 2 depicts a number of on-board elements in a vehicle that are useful in understanding the user profile processing. The on-board equipment, for example, includes a telematics unit 16. The telematics unit 16 connects to a computer 64 in the vehicle 14 via a vehicle bus 65. The computer 64 includes a processor and has a memory. The memory of the computer 64 contains a computer program. Additionally, the vehicle 14 has one or more user interfaces 68 to allow a user to control aspects of the vehicle 14, including the telematics unit 16. The user interface may include a touch screen, a dial, a key pad, a display, audio input and/or output element, or the like. The user interface 68 may also be a navigation system on the vehicle 14.

Traditionally, the telematics unit 16 provides emergency and other related services. Examples include crash detection, road side assistance, and navigation related functionality, such as turn-by-turn directions. The telematics unit 16 is provisioned relative to the network 10 to operate in a manner similar to a mobile station 12, although the network services available to the telematics unit 16 may be limited when compared to those provided to a typical mobile station 12. For example, the telematics unit 16 may be provisioned only to send/receive voice, SMS type messaging communications, and data to/from call centers of a telematics service provider or specific elements (e.g., on-demand multimedia services servers) of the network 10. However, as discussed more later, in our example, communications to/from the unit 16 either directly or via an associated user's mobile station 12 also support communications relating to the transfer a driver's profile with one or more settings for user configurable features of a vehicle. An example of a telematics service is On-Star, although the technology of the telematics units 16 used in that service have evolved and continue to evolve over time. In some instances, the telematics unit 16 and the mobile station 12 can be paired using Bluetooth technology. In such a situation while the telematics unit 16 may not need to be able to access the network 10, it may instead (or in addition) access the network 10 via the mobile station 12. An example of an implementation of a telematics unit will be described in more detail, later, with respect to FIG. 2.

Returning to the example of FIG. 1, the telematics unit 16 is the system on-board the vehicle that supports the driver profile related communications and control, although some aspects involve interactions with other on-board equipment of the vehicle. For example, if the driver has already established a profile with one or more settings stored in the IP Multimedia Subsystem (IMS) server 42, or web server 41 in communication with the IMS server 42, the telematics unit 16 functions to detect an identification associated with a user, upon entry of the user to drive the vehicle and to send a query via the mobile communication network 10 for the server 41 and/or 42. The query includes the identification associated with the user and information related to the vehicle, such as its make and/or model or possibly information otherwise identifying configurable components of the particular type of vehicle.

As discussed more, later, the IMS server 42 and/or the web server 41 are used to facilitate the services/features relating to transfer of a driver's profile with one or more settings for user configurable features of vehicles 14, 14b. The IMS server 42 and/or the web server 41 are also used to transcode or scale settings when the vehicles 14, 14b are different types of vehicles. The web server 41 provides the user interface for account related functions, e.g. via a mobile or Internet web session from a personal computer (PC) or a mobile station. The web server 41 typically stores the driver profile and the IMS server 42 transfers the profile or a transcoded profile to a different vehicle 14b. Of course, other server arrangements could be used to implement the same or similar functions vis-à-vis the driver profile transfer service. In the example, the servers 41 and 42 are operated by the carrier or service provider operating the mobile network 10 and offering mobile services to mobile devices 12 and units 16, 16b. Those skilled in the art will appreciate that the server functions and related profile transfer service may be provided by other parties, such as a provider of the telematics service, a provider of a navigation service, an automobile manufacturer, etc.

For the driver profile-related communications and control, the telematics unit 16 in one example also is configured to receive a response from the IMS server 42 via the mobile communication network 10. The response includes the driver profile for the user. The received driver profile specifies a driver preference setting for each of one or more configurable components of the vehicle 14. The driver preference setting(s) specified in the received driver profile conform to one or more preferences of the user previously supplied to the IMS server 42. Based on the received driver profile, the telematics unit 16 provides control signaling, either directly or through an on-board controller of the vehicle 14, to the one or more components of the vehicle 14 to configure the component(s) in a manner corresponding to the one or more preferences of the user previously supplied to the IMS server 42.

As noted, the telematics unit 16 detects or receives an identification associated with a user, upon entry of the user to drive the vehicle 14. The user identification can be received in a variety of ways. For example, the user may input an identifier manually, through the user interface element(s) 68 in the vehicle 14. Alternatively, the telematics unit 16 or another user interface 68 of the vehicle bus 65 in the vehicle 14 may communicate directly or wirelessly (e.g. via Bluetooth or WiFi) with the user's mobile station 12 to obtain the user's mobile directory number (MDN) or other device related identification of the user. For further discussion purposes, the example relies on an identifier received from a keyless entry token or fob 18.

According to an alternative embodiment, a camera located on a vehicle may be used in conjunction with facial recognition software to provide a user identification. The camera may be position within the vehicle such that a picture can be taken of the user and transmitted to the IMS server 42. The IMS server 42 may perform face recognition to associate the correct profile to the user based on a stored picture of the user.

Many vehicles 14 now utilize a key fob 18 that allows for "keyless" operation of the vehicle. The key fob 18 broadcasts a signal, such as a radio signal, to the vehicle 14 that the vehicle 14 compares to information stored in a control system of the vehicle 14 to verify that the key fob 18 is associated with the vehicle 14. When a key fob 18 is associated with the vehicle 14, the doors of the vehicle 14 may be locked and unlocked, such as by pressing a button on the door, pulling on the door handle, touching a specific region proximate a door handle, or the like. Similarly, some vehicles 14 may be programmed to unlock the doors when the key fob 18 is within a certain proximity to the vehicle 14 and to lock the doors when the key fob 18 is taken outside a predefined radius or distance relative to the vehicle 14. The proximity of the key fob 18 to the vehicle 14 may be determined in a number of ways, such as based on strength of a signal broadcast by the key fob 18 to the vehicle 14 where the signal carries an identifier associated with or otherwise recognized by the on-board equipment. Once inside the vehicle 14, a start button may be pressed to allow operation of the vehicle 14 such as by starting the engine or allowing operation of electric motors when the key fob 18 is detected as being inside the vehicle 14.

A key fob 18 typically has a unique identification number associated with it, particularly if the key fob 18 broadcasts a radio signal. A vehicle 14 may be adapted to allow multiple key fobs 18 to be operable with that vehicle 14, such as by storing multiple key fob identification numbers in the control system of the vehicle 14. When multiple key fobs 18 are associated with the vehicle 14 and are detected by the vehicle 14, a predefined key fob mastership may be stored in the computer 64 of the vehicle 14. For instance, if the vehicle 14 has two key fobs 18, key fob A and key fob B, the mastership may be set so that key fob A controls when both key fobs 18 are detected. Alternatively, the predefined mastership may be stored in the customer account web server 41, such that the telematics unit 16 will transmit the identity of all of the key fobs 18 detected, and the stored mastership information on the account web server 41 determines which user profile to transmit to the vehicle 14. The two key fobs 18 may simply need to be proximate the vehicle for the key fobs 18 to be detected. It is contemplated that the key fobs 18 may be detected by the telematics unit 16 in some embodiments.

As noted, the user profile processing and vehicle configuration functions may use a variety of different types of user identification techniques. In the example, a key fob 18 may be associated with a driver profile stored on the vehicle 14 and/or on a web server 41 and/or an IMS server 42. If the driver has set-up the profile through the vehicle 14 or the profile was downloaded during a previous use of the vehicle 14, the profile will already be stored in the vehicle memory. If not already stored, the profile can be downloaded from the web server 41 via the IMS server 42 based on the correlation of the identification of the key fob 18 to the identification(s) for the user's profile account in the server(s). The driver profile may be stored in a memory associated with a computer or processor in a second vehicle 14b. The downloaded driver profile remains on the second vehicle 14b as long as the association between fob 18 and unique index exists. If the key fob 18 or the unique index is changed, then the profile would be updated upon the next detection of the key fob 18. The driver profile contains one or more settings for adjustable elements of the vehicle 14. It is also contemplated that any one vehicle 14 may contain multiple driver profiles, such as one for each different key fob 18 used with the vehicle 14 and/or for any user identified by other means.

FIG. 2 is a functional block diagram of an exemplary telematics unit 16 and associated equipment, as may be used in a vehicle 14 shown in FIG. 1. The telematics unit 16 includes a telematics control unit (TCU) 61 and a wireless Network Access Device (NAD) 63. The TCU 61 may be implemented as a microprocessor (μP) 74 with one or more memories 76, an interface 72 to vehicle equipment, an interconnection to the NAD 63, and programming to implement the emergency monitoring and notification functions. Programming in the memory 76 of the TCU 61, for example, enables the TCU microprocessor 74 to process the signals received via the interface 72 to detect occurrence of the emergency condition, and in response to detecting the occurrence of the emergency condition to instruct the NAD 63 to initiate an emergency call typically to a call center of the telematics service provider. The programming in the memory 76 of the TCU 61 also enables the TCU microprocessor 74 to process the signals received via the interface 72 to detect a unique user activation, which indicates the user's desire to activate telematics service, and in response, to instruct the NAD 63 to initiate an activation call using the cleared number to the TSP service activation center. The programming in the memory 76 of the TCU 61 further enables the TCU microprocessor 74 to activate telematics service. Of note for purposes of the present discussion, programming in the memory 76 of the TCU 61 further enables the TCU microprocessor 74 to operate through the NAD 63 to transmit or receive a user profile.

The vehicle 14 (FIG. 1) typically includes a vehicle bus, shown at 65 in FIG. 2, for providing digital data communications among various on-board devices/systems, particularly for vehicle diagnostics purposes and user adjustable settings for the configurable components of the vehicle 14. The vehicle includes a computer 64 functioning as the on-board controller of the vehicle 14 to control overall operations of the vehicle 14. For at least the emergency aspects of the telematics operations, the vehicle 14 further includes one or more sensors 67 for detecting conditions that may relate to vehicle operations, as well as used to detect a vehicle crash.

The vehicle also includes one or more of a variety of user configurable components, represented collectively by the box 62 in FIG. 2. Examples of such components include the driver's seat, one or more of the mirrors, one or more pedal positions, radio station presets, HVAC, on-board sound system, etc. In operation, the driver can adjust any or all of these user configurable components to desired settings by the normal user operation elements of those components. In the vehicle 14, the settings are made available from the components as data supplied to the vehicle bus 65, as represented in the drawings by the one or more user adjustable settings shown as a block 66. The controls of the one or more user adjustable settings, the controls of the telematics unit 16, the controls of the navigation system, other user operated controls, information generated regarding status of the vehicle, such as data obtained from sensors, and other data found on the vehicle bus 65 are examples of input elements.

Some or all of the settings are input by driver operation of the regular controls for user configurable components 62. Some components may be adjusted by input of settings via the user interface 68. The settings 66 may include position settings for adjustable features of a seat, mirror settings, position settings for one or more pedals, radio station presets, one or more HVAC settings, and the like. The components 62 are connected to the vehicle bus 65. The vehicle bus 65 provides the continuous electrical connection within the vehicle for the communication of diagnostics data from the sensors 67 and the user adjustable settings 66 to the TCU 61 and where appropriate to the computer 64.

Once input and available on the vehicle bus 65, the settings can be stored by the on-board computer 64. The on-board computer 64 may store several sets of settings or profiles for different drivers associated with the vehicle. Based on a fob identification or identification input via the user interface 68, the on-board computer 64 can load a locally stored profile as the adjustable settings 66, and the user configurable components 62 responds to the computer-input settings to the positions or other configurations indicated by the driver preference settings specified in the driver profile, to thereby conform to preferences of the user previously input and locally stored by the computer 64.

Via the vehicle bus 65, the settings are also available to the TCU 61, either directly from the settings 66 of the configurable components 62 or from storage in the on-board computer 68 for driver profile uploading. As discussed later, a profile containing settings for the user configurable components 62 also can be downloaded to serve as settings 66 and/or for local storage in the on-board computer 64, via the TCU 61 and the vehicle bus 65.

In our example using a telematics unit, the TCU supports emergency reporting functions and related services managed and offered by an automotive telematics service provider. The TCU 61 is programmed to process data received from the sensors 67. The vehicle may also include a panic button 69, coupled to communicate with the TCU 61 via the vehicle bus 65. A vehicle occupant would activate the panic button 69 in the event of a condition that the occupant perceives as an emergency. The TCU 61 determines that there has been an emergency event warranting an automatic report to the TSP call center, in response to crash detection from the processing of the data from the sensor(s) 67 or in response to activation of the panic button 69. The TCU 61 also may report to the TSP call center if a user profile in the vehicle 14 is to be saved or recalled. The TCU 61 activates the NAD 63 to initiate the communication with the TSP call center. The NAD 63 acts as the communications tool for entry to the wide area wireless network via cellular communications.

Of note for purposes of this discussion, the telematics unit 16 also supports the transfer of driver profiles to and from the vehicle 14. For example, the TCU 61 is further programmed to process data related to the user adjustable settings 66 and to use the NAD 63 for wireless communication with one or more servers for uploading and receiving of profiles containing user adjustable settings. For uploading to a server, the TCU 61 can obtain the settings 66 directly or obtain settings from storage in the on-board computer 64 via the vehicle bus 65. When receiving a profile download from a server, the TCU 61 can apply the profile as a new batch of settings 66 for control of the components, although typically the new profile settings will be in the on-board computer 64 whether or not immediately applied as new settings 66 for controlling the configurable components 62.

The vehicle typically includes one or more elements, such as a touchscreen display or a combination of a keypad and a display, which form a user interface 68 for non-emergency input/output functions. The bus 65 also provides digital data communications between the user interface 68 and the TCU 61. Of note for purposes of this discussion, the user interface 68 provides an input and output system to control operations of the TCU 61 and associated profile transfer communications, using the NAD 63.

The NAD 63 is a wireless transceiver unit configured for communications via the wireless communication facilities of the mobile network and associated landline facilities that make up the system 10 of FIG. 1. The NAD 63 is generally similar to a wireless mobile station 12 configured for voice and data communications. It is assumed that those skilled in the art are familiar with the structure and operation of mobile stations 12 and thus with the structure and operation of generally similar devices that may be used to implement the NAD 63. To insure a full understanding by all readers, however, it may be helpful to consider a high level summary review of the relevant structure of one example of a NAD 63.

The NAD 63 supports both data communication and voice communication, for various communications related to telematics services and possibly for regular cell phone service. At least the data communication capability is also used for the driver profile transfer service.

For the voice communication function, the vehicle 14 includes a microphone 71 for audio signal input and a speaker 73 for audio signal output. The microphone 71 and the speaker 73 connect to voice coding and decoding circuitry (vocoder) 75 within the NAD 61. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The concepts discussed here encompass embodiments of the NAD 63 utilizing any digital transceivers that conform to current or future developed digital wireless communication standards. For example, the transceiver 77 could be an EVDO, LTE TDMA or GSM unit designed for cellular or PCS operation. In the present embodiments, the digital transceiver 57 is a CDMA transceiver compatible with operation via an IS-95 network or a 1x-RTT network, to provide both voice and/or data communications. As discussed more, later, such transceivers also support certain over-the-air communications relating to provisioning and/or service activation.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. These signaling messages, for example, also enable SMS communications. The transceiver 77 connects through RF send and receive amplifiers (not separately shown) to an antenna 79. The NAD 63 may include one or more additional transceivers, as shown in dotted line form, for operation in an analog mode or in accord with an alternative digital standard, such as EVDO or LTE.

A microprocessor 81 acts as a controller for controlling all operations of the NAD 63. The microprocessor 81 is a programmable controller. The NAD 63 also includes flash type program memory 83 and/or a non-volatile random access memory (RAM) 85, for storing various software routines and mobile configuration settings, for use by the microprocessor 81.

Returning to the system of FIG. 1, the mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 12 will typically include one or more RANs and a regional circuit and/or packet switched network and associated signaling network facilities.

Physical elements of a RAN operated by one of the mobile service providers or carriers include a number of base stations represented in the example by the base station (BS) 19. Although not separately shown, such a base station 19 typically comprises a base transceiver system (BTS) which communicates via an antennae system at the site of base station and over the airlink with one or more mobile station 12, or telematics units 16, 16b when the mobile stations 12 and telematic units 16, 16b are within range. Each base station typically includes a BTS coupled to several antennae mounted on a radio tower within a coverage area often referred to as a "cell." The BTS is the part of the radio network that sends and receives RF signals to/from the mobile stations 12 and/or telematics units 16, 16b that the base station 19 currently serves.

The radio access networks also include a traffic network represented generally by the cloud at 21, which carries the user communications for the mobile stations 12 and the telematics units 16, 16b between the base stations 19 and other elements with or through which the mobile stations communicate. The mobile traffic network 21 includes various elements that control and route various voice, data and messaging communications for all mobile devices (e.g., mobile stations 12 and telematics units 16, 16b in the examples described) and may include elements that support other related types of services such as location based service (LBS).

In addition, the mobile traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

In communication with the private data network 36 can be various auxiliary services servers that provide additional services to the users of the network 10 and/or to operations support personnel of the service provider or carrier that operates the network 10. For example, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 41, offering a 'MyAccount' (Now MyVerizon) type subscriber interface via the Internet. The web server 41 may comprise a processor and a memory coupled to the processor. The memory may be adapted to store information about a user based on or indexed by a user's unique ID, such as, the users email address or the user's MDN. At least one of the processor and the memory of the web server 41 may contain an executable program.

A user's terminal, such as PC 31, may be used to access on-line information about a subscriber's account, which the mobile carrier makes available via the carrier's MyAccount web site accessible through the Internet 29. Of note for purposes of the present discussions, the web site provides secure user access to configure the operation of the vehicle setting profile service via the server 41. For instance, the user may be able to log on to their account and manipulate any settings to the account, such as the key fob 18 association with the user's unique ID. The key fob 18 identification number may have an ID number visible on the key fob 18 which the user may enter, or a user may have to enter a vehicle identification number (VIN) for the vehicle 14 with which the key fob 18 is associated. The user may link multiple key fobs to the account, including, but not limited to, key fobs of a borrowed vehicle, a rental vehicle, a vehicle of a parent, a vehicle of a spouse, a work vehicle, and the like. The user may have to provide the unique ID associated with the profile that they wish to transfer to the vehicle when the key fob 18 has been associated with multiple accounts, such as may occur when using a borrowed vehicle. The user may utilize the user interface 68 to provide the unique ID.

If a key fob is registered, the key fob identification can be used in the transfer of a profile to or from server storage from or to a vehicle. If the driver has not registered a key fob for a vehicle or the vehicle does not utilize a key fob, the driver may still provide another account associated user identification such as the MDN, for example, via the user interface 68 or Bluetooth pairing of the on-board systems with the driver's mobile station.

Data from the vehicle 14 may be transmitted from the telematics unit 16 to the network 10. Data may also be transmitted from the network 10 to the vehicle 14 from the telematics unit 16. For example, a user profile having settings for a number of user configurable features 62 of the vehicle 14 may be transmitted to or from the unit 16 or 16b in the vehicle through the network 10. An uploaded user profile is stored on the customer account web server 41, which in our example is connected to an IP Multimedia Subsystem (IMS) server 42. The customer account web server 41 utilizes a unique ID for the user, such as a Mobile Directory Number (MDN) of a user's mobile station 12, an email address, or another unique alphanumeric sequence, as an account number to store information associated with the user profile from the vehicle 14, and that data may be shared with the IMS server 42. The account information thus includes the profile as well as the various identifiers associated with the driver, e.g., key fob identifiers, MDN, email address, etc.

Hence, in our example, the web server 41 may store information relating to the key fob 18, such as the unique identification number associated with the key fob 18 to the customer account associated with a particular unique ID. As mentioned above, the vehicle 14 may associate the unique identification number of the key fob 18 to a particular user profile. If a profile is not yet associated with a particular key fob 18, it may be entered locally, or the server(s) can download the user's profile via the network 21. If previously entered via an Internet communication with the MyAccount web server 41, the telematics unit 16 sends the key fob 18 unique identification number to obtain a download of a previously stored driver profile from the driver's account. For the profile transfer service, the key fob 18 unique identification number may also be transmitted from the telematics unit 16 to the IMS server 42 via the network 10 and stored in the account associated with the user's unique ID on the web server 41. The information relating to the key fob 18 may include information about the vehicle 14, such as the brand and model of the vehicle 14.

The key fob 18 may be registered by a user to the account associated with the user's unique ID on the web server 41 in multiple ways. The user may utilize the PC 31 to provide information to the web server 41 via the internet 29 and the private data network 36 about the key fob 18. Thus, the identification number of the key fob 18 may already be stored on the account associated with the user's unique ID on the web server 41 prior to the user utilizing the key fob 18 to enter the vehicle 14.

Alternatively, a user interface 68 within the vehicle 14 may allow the telematics unit 16 to transmit the information about the key fob 18 to the IMS server 42, which then communicates with the web server 41. The web server 41 communicates with the IMS server 42 and sends a signal over the network 10 to the telematics unit 16 to query a user about associating the key fob 18 with a user account, based on the user's unique ID, when the key fob 18 is not located in an existing account on the web server 41 to determine if the user wishes to associate the key fob 18 with the user's account.

Once a key fob 18 is associated with a user's account on the web server 41 based upon the user's unique ID, a user profile for the vehicle 14 may be uploaded to the user's account on the web server 41 via the telematics unit 16 contacting the IMS server 42. When a user of the vehicle 14 attempts to save a user profile, the telematics unit 16 asks the user if they wish to save the user profile for the vehicle 14 to the user's account on the web server 41. If they wish to save the user profile for the vehicle 14, the telematics unit 16 transmits the user profile via the network 10 to the IMS server 42 that communicates with the web server 41 and the user profile for the vehicle 14 is added to the user's account.

The user profile created on and for the vehicle 14 is stored in association with the user's account on the web server 41. The user's account contains information about the key fob 18, including its identifier and information about the vehicle 14 that the key fob 18 controls, such as a manufacturer and model of the vehicle 14. The information about the vehicle 14 is useful in order to determine control data for relative positions of items like the seat position setting, mirror settings, steering wheel settings, accelerator and brake pedal position settings on vehicles with adjustable pedals, and the like, such that these relative positions can be stored in the user's account on the web server 41, and then applied to a second vehicle 14b the user is going to operate. In addition to position type settings for configurable components, some configurable aspects of other components types may depend on or vary based on vehicle type.

A transcoder may be contained in the IMS server 42 or the web server 41 that contains information on a large number of different types of vehicles. The transcoder allows dimensions from the user profile of the user's account on the web server 41 to be scaled or otherwise adapted to different types of vehicles. For instance, if the user profile is established on a first vehicle 14, which is a large car, and the user wishes to apply the stored user profile from the web server 41 using the telematics unit 16 and the network 10 on a second vehicle 14b, which is a small car, the transcoder makes appropriate modifications to the settings, such as the seat position and/or mirror positions, to emulate the user profile settings of the first vehicle 14 in the second vehicle 14b. The transcoder contains data on numerous vehicles, and adjusts stored setting for application to a different type of vehicle, based on the relative dimensions between the vehicle the user profile was created on, and the type of vehicle the user profile is being sent to by the IMS server 42. Thus, the user should not have to make many adjustments to the settings in the second vehicle 14b, based on the adjustments made by the transcoder even though the vehicles 14, 14b are of different types in this example.

There may be limitations to the actions of the transcoder, such as when the user profile is established in a large first vehicle 14, and a similar seat position may not be capable of being achieved in a small second vehicle 14b. For instance, a tall driver may set the seat fore and aft position proximate the aft limit of the seat fore and aft adjustment, if the tall driver then applies their user profile to a small second vehicle 14b, the seat may not be capable of being positioned as far away from a reference point, such as a steering wheel, and thus the transcoder may simply result in the seat fore and aft position being set to the aft travel limit in the second vehicle 14b.

Figure 3:
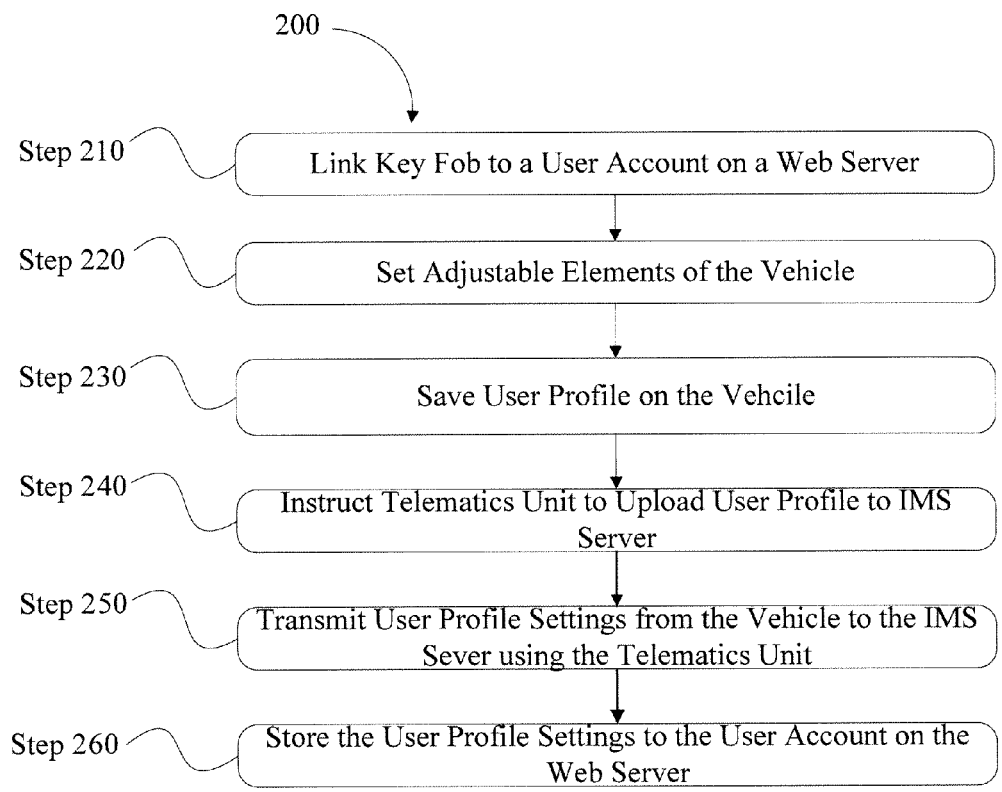
FIG. 3 is a flow chart showing an exemplary method of uploading of a driver profile from a vehicle to a centralized server.

Turning now to FIG. 3, a method 200 of saving a user profile to the web server 41 is shown. The method 200 includes linking identification of a key fob 18 (step 210) to the user's account on the web server 41. On-line registration of the key fob 18 using a mobile station 12 or a user data terminal such as PC 31 and via the equipment on-board the vehicle 14 are contemplated.

For example, the linking may occur via a computer 31 that connects to the user's account on the web server 41 based on the user's unique ID. The user logs onto the web server 41 over the interne 29 and the private data network 36. The account information is linked to the unique ID, such as the MDN of the user's mobile station 12 with the network service provider. The user may then provide an identification number located on the key fob 18 to the user's account, which is added to the account related information stored on the server. A similar procedure may be used to access the web server 41 and input the key fob information from a mobile station 12 having a data service and running a browser or a profile service specific device application.

Alternatively, the telematics unit 16 may ask the user if the user wishes to associate a key fob 18 with a user's account on the web server 41 the first time the key fob 18 is used with the vehicle 14, or if the telematics unit 16 contacts IMS server 42 and the web server 41 and the key fob 18 is not located on the web server 41 as being previously associated with a user's account. The telematics unit 16 may then request that the user provide a unique ID, and potentially a password, or personal identification number, in order to access the user's account on the web server 41 and associate the key fob 18 with the user's account associated with the user's unique ID.

Once a key fob 18 is a associated with the MDN of the user's mobile station 12 and stored in the web server 41, the user next may set a variety of adjustable or configurable components 62 on the vehicle 14 (step 220), such as a seat position, a mirror position, one or more pedal positions, radio station presets, HVAC settings, navigation system settings, radio settings, and the like. Electronics of the vehicle 14 detect the settings of the adjustable elements. Once the adjustable elements on the vehicle 14 are set and the settings are detected by the vehicle, the user may save a user profile on the vehicle 14 (step 230), e.g. in the on-board computer 64 and/or in memory 76 of the TCU 61. For instance, the vehicle 14 may have a user interface 68 that allows a user to store the settings as a user profile. For instance, a touch screen on a navigation system may allow a user to access a menu that contains a button, or virtual button, that a user may depress to indicate to the vehicle that the current positions of the adjustable elements should be saved as a user profile.

Once the user profile is saved on the vehicle 14, the telematics unit 16 can be instructed to upload the user profile to the IMS server 42 (step 240). For instance, the user may press a button on the telematics unit 16 provide an appropriate input via the user interface 68 to initiate a data transfer from the vehicle 14 to the telematics unit 16 and in turn to the IMS server 42. It is also contemplated that a user may depress a button to activate the telematics unit 16, and an employee of the telematics monitoring company can remotely retrieve the user profile from the vehicle 14 by using vehicle diagnostic functionality of the telematics unit 16 to access the memory of the vehicle 16 that stores the user profile. The telematics unit 16 is instructed to upload the user profile to the user's account associated with the user's unique ID via the network 10. The telematics unit 16 then transmits the user profile to the IMS server 42 over the network 10 (step 250), and the IMS server 42 provides this data to the user's account associated with the user's unique ID on the web server 41. The user profile for the vehicle 14 is then saved in or associated with the user's account on the web server 41, i.e., the account corresponding to the user's unique ID (step 260). The user profile for the vehicle 14 that is stored on the web server 41 may include a number of parameters about the vehicle 14, such as the manufacturer, the model, certain optional equipment, such as whether the vehicle 14 has a navigation system or satellite radio, such that a great deal of information about the vehicle 14 may be stored on the web server 41 in the user's account associated with the user's unique ID. This information may be based upon the key fob 18 or may be provided by the telematics unit 16, as the telematics unit 16 will have a unique identification and include the vehicle make and model with which the telematics unit 16 is associated.

It is also contemplated that the user profile may be stored on a web server 41 for a vehicle 14 without a key fob 18. In such a situation, a user interface, such as a navigation system on the vehicle 14, may ask the user to provide the user's unique ID so that the user's account on the web server 41 may be located, and the user profile stored on the user's account.

Figure 4:
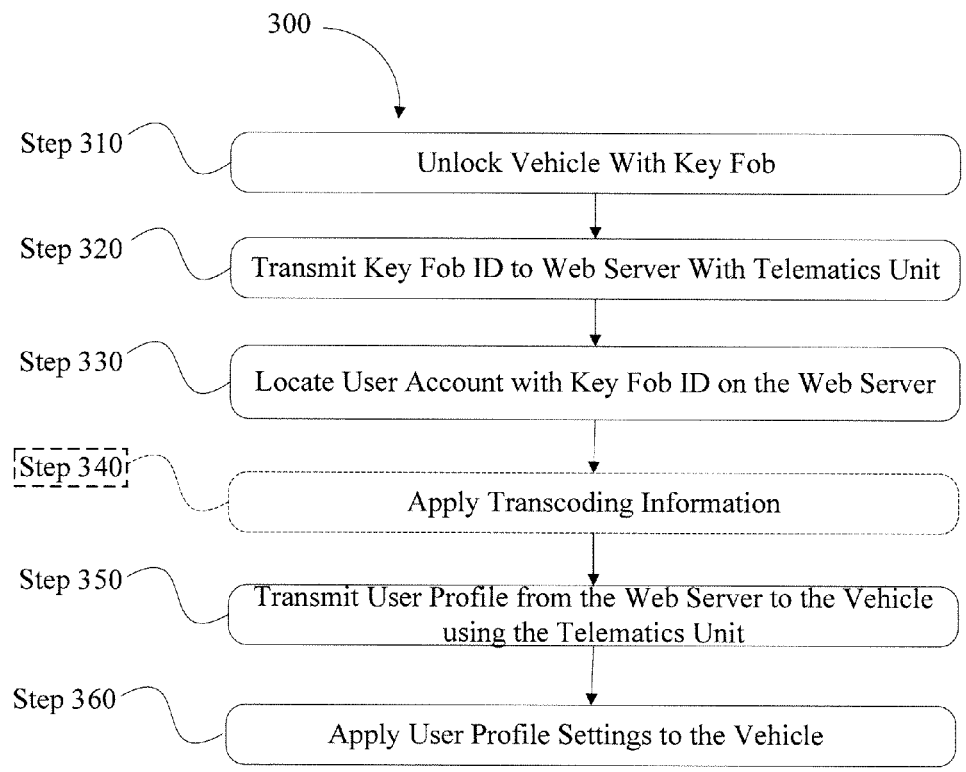
FIG. 4 is a flow chart showing an exemplary method of downloading of a driver profile from a centralized server to a vehicle.

Turning to FIG. 4, a method 300 of providing a user profile to a second vehicle 14b is depicted. The second vehicle 14b is unlocked using a second key fob 18b (step 310). In this first example, we will assume that the second key fob 18b for activating the second vehicle 14b has been previously added to the user's account in the server 41. Hence, the telematics unit 16b of the second vehicle 14b transmits the identification of the second key fob 18b over the network 10 to the IMS server 42 (step 320) which then communicates with the web server 41. The web server 41 is searched for a user account associated with a unique ID having the corresponding second key fob 18b identification stored in the user account.

The message from the telematics unit 16b includes information, such as vehicle type, for the second vehicle 14b. The user's account information in the web server 41 includes information about the first vehicle 14 on which the stored driver profile was created. If the information from the second telematics unit 16b indicates that the second vehicle 14b in which the second key fob 18b is being utilized is a different type of vehicle than the vehicle 14 in which the user profile in the user account associated with the MDN on the web server 41 was established, then transcoding information is applied to the user profile (step 340). As explained above, the transcoding information is utilized to adjust certain dimensional adjustable elements based on the size of the vehicle the user profile was established in relative to the size of the vehicle to which the user profile is being transmitted. If the vehicles 14 and 14b are of the same type, then the transcoding step 340 may be skipped.

Next, the user profile is transmitted from the web server 41 to the IMS server 42 and to the second telematics unit 16b of the second vehicle 14b over the network 10 (step 350). The user profile is then applied to the second vehicle 14b, to adjust the adjustable elements of the second vehicle 14b according to the user profile (step 360). The second telematics unit 16b may be in communication with electronic controllers of the second vehicle 14b to allow the user profile to be applied to the second vehicle 14b to adjust the adjustable elements. For instance, the seat is adjusted to a fore and aft position comparable to the user's typical position, the mirrors are adjusted to the user's typical settings, and the radio presets may be changed to the user's favorite stations.

Figure 5:
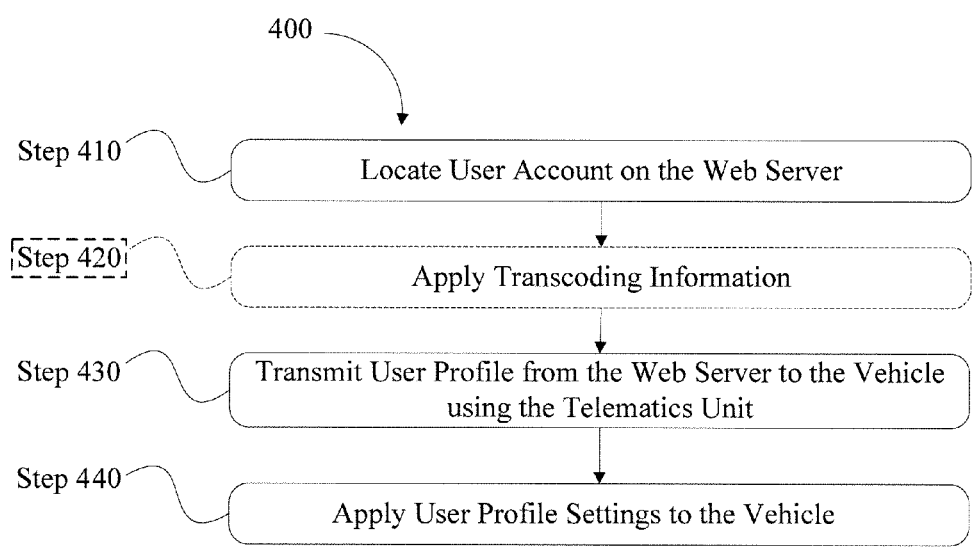
FIG. 5 is a flow chart showing another exemplary method of downloading of a driver profile from a centralized server to a vehicle.

FIG. 5 shows an alternative method 400 of applying a user profile from a web server 41 to the second vehicle 14b. A user may utilize the second telematics unit 16b to contact the IMS server 42 which in turn communicates with the web server 41 to locate the user's account based on the user's unique ID (step 410). The method 400 shown in FIG. 4 does not require the use of a second key fob 18b, or may be utilized when the second key fob 18b has not yet been associated with the user's account on the web server 41. The user may provide a unique ID, such as an MDN number or other user identifier associated with the user's account on the web server 41 in order for the second telematics unit 16b to be able to obtain the user profile from the web server 41 using the IMS server 42. For example, the user may enter an identifier such as an MDN via a user interface in the vehicle 14b, or the user's mobile station may be paired with the telematics unit 16b via Bluetooth to provide the MDN.

As in the preceding example, the message from the telematics unit 16b includes information, such as vehicle type, for the of the second vehicle 14b; and the user's account information in the server 14 includes information about the first vehicle 14 on which the stored driver profile was created. If the information from the second telematics unit 16b indicates that the second vehicle 14b is a different type of vehicle than the vehicle 14 the user profile on the user account associated with the unique ID on the web server 41 was established on, transcoding information is applied to the user profile (step 420). Of course, if the vehicles 14 and 14b are of the same type, then the transcoding step 420 may be skipped.

Next, the user profile is transmitted from the web server 41 to the IMS server 42 and the second telematics unit 16b of the second vehicle 14b over the network 10 (step 430). The user profile is then applied to the second vehicle 14b, to adjust the adjustable elements of the second vehicle 14b according to the user profile (step 440). The second telematics unit 16b may be in communication with electronic controllers of the second vehicle 14b to allow the user profile to be applied to the second vehicle 14b to adjust the adjustable elements.

While the embodiments have been described as the user profile being stored on the web server 41, it is contemplated that in an alternative embodiment the user profile may be stored on the IMS server 42, and the web server 41 is used to provide a way to link a user identifier, such as unique ID, like an MDN or an email address, to a user account, and to allow a user to associate a key fob identifier with a user account.

FIGS. 6 and 7 provide functional block diagram illustrations of general purpose computer hardware platforms. FIG. 6 illustrates a network or host computer platform, as may typically be used to implement a web server 41, IMS server 42 or other network elements. FIG. 7 depicts a computer with user interface elements, as may be used to implement a personal computer (PC) or other type of work station or terminal device, although the computer of FIG. 7 may also act as a server if appropriately programmed. For example, such general purpose platforms may store the user profile and load the user profile into the vehicle 14, 14b via the respective telematic units 16, 16b, via a network communication if the platform is a server or via a local link if the platform is a PC. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for use in a vehicle comprising:
   an interface for receiving signals from and sending signals to one or more input elements;
   a mobile communication transceiver, for wireless communications through a mobile communication network;
   a processor coupled to the interface and the wireless transceiver;
   a memory coupled to the processor; and
   a program stored in the memory, wherein execution of the program by the processor configures the system to perform functions, including functions to:
      detect an identification associated with a user in response to the user coming into proximity of a vehicle;
      when the identification associated with the user was not previously detected:
         send a query via the mobile communication network for a server, the query including the identification associated with the user;
         receive a response to the query from the server via the mobile communication network, the response including a driver profile for the user;
         store the received driver profile for the user in the memory, the stored driver profile subsequently providing an indication that the identification associated with the user was previously detected; and
         apply the received driver profile for the user within the vehicle; and
      when the identification associated with the user was previously detected, as indicated by previous storage of the received driver profile for the user being disposed in the memory:
         retrieve, from the memory, the received driver profile for the user previously stored in the memory when the identification associated with the user was not previously detected; and
         apply the retrieved driver profile for the user within the vehicle,
      wherein:
         (a) the driver profile specifies a driver preference setting for one or more configurable components of the vehicle, and
         (b) the one or more driver preference settings specified in the driver profile conform to one or more preferences of the user previously supplied to the server.

2. The system of claim 1, wherein based on the received driver profile, the system is adapted to provide control signals to the one or more components of the vehicle to configure the one or more components in a manner corresponding to the preferences of the user previously supplied to the server.

3. The system of claim 1, wherein the system is configured as a telematics unit within the vehicle.

4. The system of claim 1, wherein the system is configured as a navigation unit within the vehicle.

5. The system of claim 1, wherein the driver profile specifies the driver preference settings for each of one or more configurable components of the vehicle including:
   seat position, positions of mirrors, one or more pedal positions, radio station presets, heating, ventilating, and air conditioning (HVAC) settings, or navigation screen configuration.

6. The system of claim 1, further comprising a key fob having a unique identification number, wherein the identification associated with the user is detected from the key fob.

7. The system of claim 6, wherein the identification associated with the user includes a mobile directory number associated with the user.

8. The system of claim 1, wherein a predefined key fob mastership setting is applied when multiple key fobs are detected proximate to the vehicle.

9. A system for transferring driver profile settings, comprising:
   a communication interface for network communications;
   a processor coupled to the interface;

a storage device coupled to the processor; and a program in the storage device, wherein execution of the program by the processor configures the system to perform functions, including functions to:

receive a query, from a unit in a vehicle and through a mobile communication network to the communication interface, sent from the unit upon a user being in proximity of the vehicle, the query including an identification associated with the user and information related to the vehicle;

based on the identification associated with the user, look up a record of the user in the storage to obtain a preference of the user for each of one or more configurable vehicle components;

identify, based on the information in the query related to the vehicle, a first vehicle type for the vehicle containing the unit;

identify a second vehicle type for a vehicle on which the one or more preferences of the user previously supplied to the server are based;

upon determining the first and second types of vehicle are different, transcode the previously supplied one or more preferences of the user to one or more preference settings corresponding to one or more configurable components of the first vehicle type, to obtain one or more driver preference settings for one or more configurable components of the vehicle containing the unit; and transmit a response message from the interface back through the mobile communication network to the unit in the vehicle, the response message including a driver profile specifying a driver preference setting for each one or more configurable components of the vehicle containing the unit conforming to the one or more preferences of the user previously supplied to the server.

10. A method comprising:

detecting, by a vehicle unit within a vehicle, an identification associated with a user in response to the user coming into proximity of the vehicle;

when the identification associated with the user was not previously detected:

sending a query for a server, via a mobile communication network, the query including the identification associated with the user;

receiving a response to the query from the server, via the mobile communication network, the response including a vehicle user profile for the user;

storing, by the vehicle unit, the vehicle user profile for the user in a memory of the vehicle, the stored vehicle user profile subsequently providing an indication that the identification associated with the user was previously detected; and configuring, based on the vehicle user profile, one or more configurable components of the vehicle; and when the identification associated with the user was previously detected as indicated by previous storage of the received vehicle user profile for the user in the memory:

retrieving, by the vehicle unit and from the memory of the vehicle, the vehicle user profile previously stored in the memory when the identification associated with the user was not previously detected; and configuring, based on the retrieved vehicle user profile, one or more configurable components of the vehicle, wherein:

(a) the vehicle user profile specifies a user preference setting for one or more configurable components of the vehicle, and (b) the one or more user preference settings specified in the vehicle user profile conform to one or more preferences of the user previously supplied by the user.

11. The method of claim 10, further comprising:

receiving the query from the vehicle unit at the server, the query including the user identification and information related to the vehicle;

locating a user's account on the server based at least in part upon the user identification received in the query from the vehicle unit; and transmitting a vehicle user profile from the user's account on the server to the vehicle unit via the wireless communications network.

12. The method of claim 11, wherein the locating a user's account is based upon one of a user's mobile directory number, a user's email address, and a key fob identification number stored in association with the user's account.

13. The method of claim 11 further comprising:

determining, based on the information in the query related to the vehicle, a type of vehicle having the vehicle unit;

comparing the type of vehicle having the vehicle unit to a type of vehicle the vehicle user profile on the user's account was created in; and transcoding dimensional properties of the user profile when the type of vehicle having the vehicle unit differs from the type of vehicle the vehicle user profile on the user's account was created in.

14. The method of claim 13, wherein at least one user adjustable setting is independent of the type of vehicle.

15. The method of claim 13, wherein the transcoding dimensional properties is based on a relationship between a user adjustable setting of the vehicle and a fixed location of the vehicle.

16. The method of claim 11, further comprising:

receiving, from the vehicle unit, a revised vehicle user profile based on adjustments made by the user while in the vehicle; and storing the revised vehicle user profile in association with the user's account.

17. The method of claim 10, wherein the step of detecting the identification comprises detecting the identification from a key fob having a unique identification number.

18. The method of claim 17, wherein the user profile specifies the user preference settings for each of one or more configurable components of the vehicle including: seat position, positions of mirrors, one or more pedal positions, radio station presets, heating, ventilating, and air conditioning (HVAC) settings, or navigation screen configuration.

19. The method of claim 18, wherein the identification associated with the user includes a mobile directory number associated with the user.

20. A system comprising:

a system for use in a vehicle comprising:

an interface for receiving signals from and sending signals to one or more input elements;

a mobile communication transceiver, for wireless communications through a mobile communication network;

a processor coupled to the interface and the wireless transceiver;

a memory coupled to the processor; and a vehicle use system program stored in the memory; and a system for transferring driver profile settings comprising:

a communication interface for network communications;
a processor coupled to the interface;
a storage device coupled to the processor; and
a driver profile settings transfer system program in the storage device, wherein:
execution of the vehicle use system program by the processor of the vehicle use system configures the vehicle use system to perform functions, including functions to:
  detect an identification associated with a user in response to the user coming into proximity of a vehicle;
  when the identification associated with the user was not previously detected:
    send a query via the mobile communications network for the driver profile settings transfer system, the query including the identification associated with the user and information related to the vehicle;
    receive a response to the query from the driver profile settings transfer system via the mobile communication network, the response including a driver profile for the user;
    store the received driver profile for the user in the memory, the stored driver profile subsequently providing an indication that the identification associated with the user was previously detected; and
    apply the received driver profile for the user within the vehicle; and
  when the identification associated with the user was previously detected as indicated by previous storage of the received driver profile for the user in the memory;
    retrieve, from the memory, the received driver profile for the user previously stored in the memory when the identification associated with the user was not previously detected; and
    apply the retrieved driver profile for the user within the vehicle, wherein:
      (a) the driver profile specifies a driver preference setting for one or more configurable components of the vehicle, and
      (b) the one or more driver preference settings specified in the driver profile conform to one or more preferences of the user previously supplied to the driver profile settings transfer system; and
execution of the driver profile settings transfer system program by the processor of the driver profile settings transfer system configures the driver profile settings transfer system to perform functions, including functions to:
  receive the query, from the vehicle use system through the mobile communication network to the interface;
  based on the identification associated with the user, look up a record of the user in the storage to obtain a preference of the user for each of the one or more configurable vehicle components; and
  transmit the response to the query from the interface back through the mobile communication network to the vehicle use system.

21. The system of claim 20, wherein execution of the driver profile settings transfer system program by the processor of the driver profile settings transfer system configures the driver profile settings transfer system to perform further functions, including functions to:
  identify, based on the information in the query related to the vehicle, a first vehicle type for the vehicle containing the unit;
  identify a second vehicle type for a vehicle on which the one or more preferences of the user previously supplied to the server are based; and
  upon determining the first and second types of vehicle are different, transcode the previously supplied one or more preferences of the user to one or more preference settings corresponding to one or more configurable components of the first vehicle type, to obtain one or more driver preference settings for one or more configurable components of the vehicle containing the unit.

* * * * *